United States Patent
Gondre et al.

(10) Patent No.: US 11,753,949 B2
(45) Date of Patent: Sep. 12, 2023

(54) FIBROUS TEXTURE FOR MANUFACTURING A FAN BLADE MADE OF COMPOSITE MATERIAL

(71) Applicant: SAFRAN AIRCRAFT ENGINES, Paris (FR)

(72) Inventors: Guillaume Pascal Jean-Charles Gondre, Moissy-Cramayel (FR); Clément Pierre Postec, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/798,453

(22) PCT Filed: Feb. 1, 2021

(86) PCT No.: PCT/FR2021/050179
§ 371 (c)(1),
(2) Date: Aug. 9, 2022

(87) PCT Pub. No.: WO2021/160951
PCT Pub. Date: Aug. 19, 2021

(65) Prior Publication Data
US 2023/0076445 A1 Mar. 9, 2023

(30) Foreign Application Priority Data
Feb. 10, 2020 (FR) .................. 2001304

(51) Int. Cl.
*F01D 5/28* (2006.01)
*D03D 25/00* (2006.01)
*F01D 5/14* (2006.01)

(52) U.S. Cl.
CPC ........... *F01D 5/282* (2013.01); *D03D 25/005* (2013.01); *F01D 5/147* (2013.01);
(Continued)

(58) Field of Classification Search
CPC .................. F01D 5/282; F05D 2300/603
See application file for complete search history.

(56) References Cited

U.S. PATENT DOCUMENTS

| | | | |
|---|---|---|---|
| 2007/0231154 | A1 | 10/2007 | Burdgick et al. |
| 2007/0231155 | A1 | 10/2007 | Burdgick et al. |
| (Continued) | | | |

FOREIGN PATENT DOCUMENTS

| | | |
|---|---|---|
| CN | 101046159 A | 10/2007 |
| CN | 101059080 A | 10/2007 |
| (Continued) | | |

OTHER PUBLICATIONS

International Search Report as issued in International Patent Application No. PCT/FR2021/050179, dated May 20, 2021.
(Continued)

*Primary Examiner* — Michael L Sehn
(74) *Attorney, Agent, or Firm* — Pillsbury Winthrop Shaw Pittman LLP

(57) ABSTRACT

A fibrous texture intended to form the fibrous reinforcement of a turbomachine blade made of composite material including a fibrous reinforcement densified by a matrix, wherein the fibrous texture includes an area of reduced stiffness including warp yarns or strands made of second fibers having a second elongation at break greater than the first elongation at break, the area of reduced stiffness extending in the longitudinal direction from the stilt area and up to a height less than or equal to 30% of the height of the blade, extending in the transverse direction between a first area and a second area, the first area extending over a first length from a first edge of the texture intended to form a leading edge, and the second area extending over a second length from a second edge of the texture intended to form a trailing edge.

10 Claims, 3 Drawing Sheets

(52) U.S. Cl.
CPC .... *F05D 2220/323* (2013.01); *F05D 2240/30* (2013.01); *F05D 2300/603* (2013.01); *F05D 2300/6012* (2013.01)

(56) References Cited

U.S. PATENT DOCUMENTS

| | | | |
|---|---|---|---|
| 2010/0135816 A1 | 6/2010 | Cairo | |
| 2011/0293435 A1* | 12/2011 | McMillan | F01D 5/147 416/230 |
| 2013/0224035 A1 | 8/2013 | Alexander et al. | |
| 2018/0045207 A1* | 2/2018 | Paquin | B29C 70/08 |

FOREIGN PATENT DOCUMENTS

| | | |
|---|---|---|
| CN | 101858302 A | 10/2010 |
| CN | 110344887 A | 10/2019 |
| CN | 110374796 A | 10/2019 |
| EP | 3 205 827 A1 | 8/2017 |
| EP | 3 292 991 A1 | 3/2018 |
| FR | 3 082 854 A1 | 12/2019 |
| WO | WO 2006/136755 A2 | 12/2006 |

OTHER PUBLICATIONS

First Office Action as issued in Chinese Patent Application No. 202180023146.6, dated Apr. 6, 2023.

\* cited by examiner

[Fig. 1]
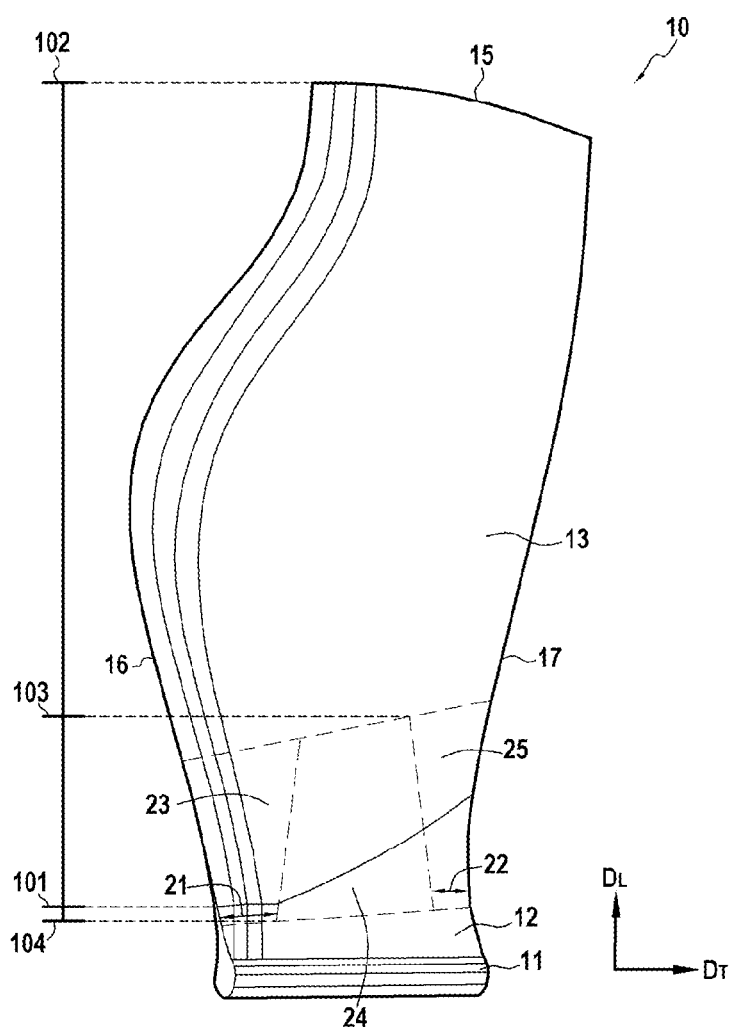

[Fig. 2]
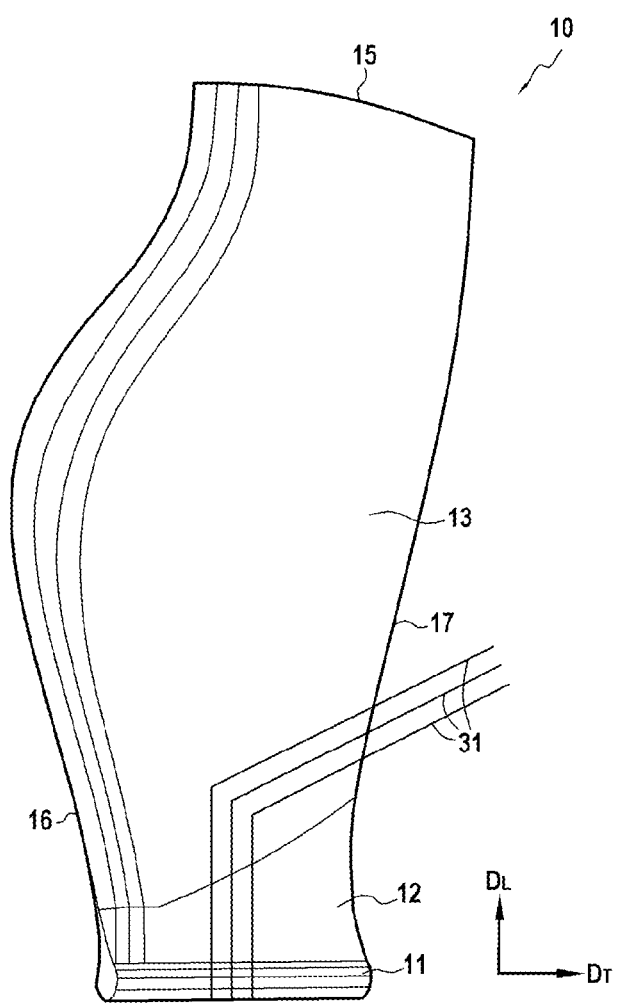

[Fig. 3]
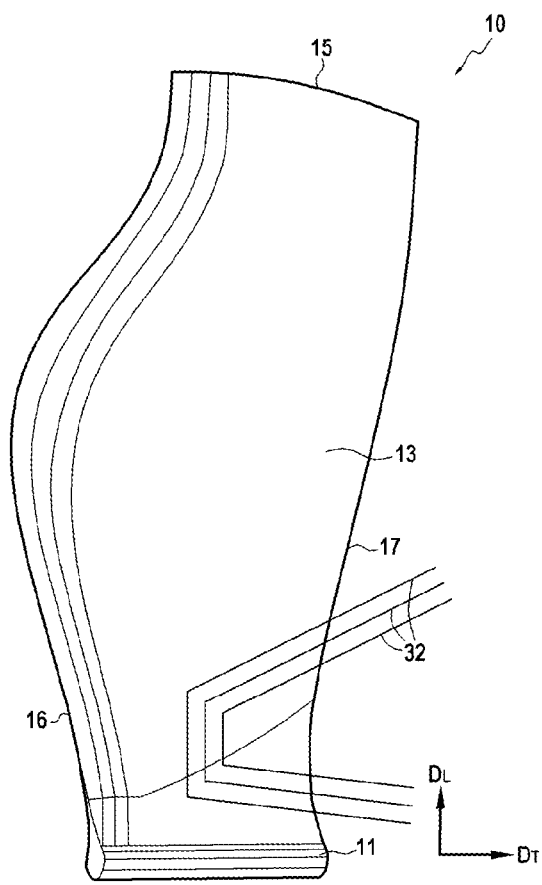
[Fig. 4]
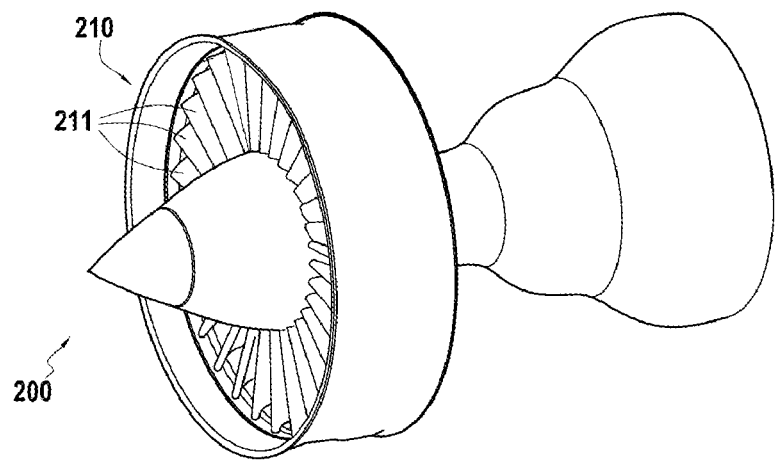

FIBROUS TEXTURE FOR MANUFACTURING A FAN BLADE MADE OF COMPOSITE MATERIAL

CROSS-REFERENCE TO RELATED APPLICATIONS

This application is the U.S. National Stage of PCT/FR2021/050179, filed Feb. 1, 2021, which in turn claims priority to French patent application number 2001304 filed Feb. 10, 2020. The content of these applications are incorporated herein by reference in their entireties.

TECHNICAL FIELD

The present invention relates to the general field of aeronautical turbomachines, and more particularly relates to a fibrous texture intended to form the fibrous reinforcement of a turbomachine blade made of composite material. Such a blade can be used in an aeronautical turbomachine fan.

PRIOR ART

Previously made of metal material, the fan blades are now made of composite material, that is to say from a fibrous preform densified by an organic matrix, which allows making parts having an overall mass lower than these same parts when they are made of metal material while having at least equivalent if not greater mechanical strength.

In operation, the fan blades may be subjected to impacts from objects, in particular birds. Upon such impact, and particularly upon ingestion of a large bird, the blade is generally fractured in its middle. However, critical damage is also observed at the stilt of the blade. It is important that this critical damage, characterized by a damage called "chip" which is initiated in compression, generating ruptures of strands on the surface, and propagates in shear, generating strong debanding in the matrix within the thickness of the part, does not lead to the fracture of the blade at its stilt. Indeed, such fracture would generate, by too great asymmetry of the weight in the turbomachine, a much greater imbalance than a fracture of the blade in its middle, which would harm the engine and its performance.

Thus, there is a need for a solution to ensure that the blade does not fracture in its stilt region in the event of impact with a foreign body.

DISCLOSURE OF THE INVENTION

To this end, the present invention proposes a fibrous texture intended to form the fibrous reinforcement of a turbomachine blade made of composite material comprising a fibrous reinforcement densified by a matrix, the fibrous texture being in a single piece and having a three-dimensional weaving between a plurality of warp yarns or strands made of at least first fibers having a first elongation at break and extending in a longitudinal direction and a plurality of weft yarns or strands made of first fibers extending in a transverse direction, the texture comprising in the longitudinal direction a blade root portion, a blade airfoil portion and a blade stilt portion between the blade root portion and the blade airfoil portion.

According to the invention, the fibrous texture comprises an area of reduced stiffness comprising warp yarns or strands made of second fibers having a second elongation at break greater than the first elongation at break, the area of reduced stiffness extending in the longitudinal direction from the stilt area and up to a height less than or equal to 30% of the height of the blade, the area of reduced stiffness extending in the transverse direction between a first area and a second area, the first area extending over a first length from a first edge of the texture intended to form a leading edge, and the second area extending over a second length from a second edge of the texture intended to form a trailing edge.

The presence of the area of reduced stiffness allows better adapting to the stresses at the level of the area likely to form a chip in the event of ingestion of a large bird. Thus, the area of reduced stiffness allows avoiding the formation of a chip or at least making it less significant than in the absence of this area.

Furthermore, limiting the presence of the area of reduced stiffness to only the area of potential formation of the chip allows keeping the rest of the blade conform to blades described previously and thus being able to use the manufacturing methods already known for the rest of the blade.

As specified above, the area of reduced stiffness extends up to a height less than or equal to 30% of the height of the blade. Such a characteristic allows limiting the area of reduced stiffness only to the area where a chip could be formed, and thus not modifying the other portions of the blade.

It should be understood that the "height of the blade" is a measurement of length defined by its bounds, namely 0% at the bottom of the aerodynamic flowpath of the blade, and 100% at the top of the flowpath. In other words, the total height between the bottom and the top of the aerodynamic flowpath of the blade is adjusted to a percentage called the height of the blade, or blade height.

According to this definition, the portion of the blade which is present below the bottom of the aerodynamic flowpath of the blade, also called stilt portion, is designated by a negative blade height. In other words, the stilt area can be defined as the area between the root of the blade and a blade height of 0%.

In one embodiment, the area of reduced stiffness extends between a blade height greater than or equal to −2% of the blade height and a blade height less than or equal to 30% of the blade height.

In one embodiment, the area of reduced stiffness extends between −2% of the blade height and 30% of the blade height. In another embodiment, it extends between 0% and 30% of the blade height.

It is indeed observed during numerous tests carried out simulating the ingestion of a large bird that it is in this area that chip-type defects appear.

Thus, it is not necessary for the area of reduced stiffness to extend over the entire stilt portion of the blade, and an area of reduced stiffness from a blade height greater than or equal to −2% allows reducing the formation of a chip.

In one embodiment, the warp yarns or strands of second fibers are introduced into the preform during the weaving of the stilt portion. Advantageously, the yarns or strands of second fibers are introduced at a blade height corresponding to a thickening of the preform. A method for manufacturing such a blade is facilitated, because the yarns or strands of second fibers can then be introduced into the preform without having to replace yarns or strands of first fibers.

In another embodiment, the area of reduced stiffness can extend from the blade root portion and up to a height less than or equal to 30% of the blade height.

This embodiment allows facilitating the weaving of a fibrous preform, since the yarns or strands of second fibers comprised in the area of reduced stiffness can be introduced into the preform from the start of its weaving.

In one embodiment, it is particularly advantageous to have an area of reduced stiffness which extends up to a height less than or equal to 30% of the blade height since, indeed, at such blade heights, the thickness of the blade decreases, so that the yarns or strands of second fibers comprised in the area of reduced stiffness can be extracted from the preform at this location in order to reduce the thickness of the blade, without having to be replaced by the insertion of first fibres. This results in a method for preparing such a particularly facilitated texture.

In one embodiment, the area of reduced stiffness has a volume rate of second fibers comprised between 25% and 75%.

Without wishing to be bound by theory, the inventors consider that a volume rate of second fibers, satisfying the stated condition, allows effectively improving the is resistance of the blade to the formation of a chip, in the event of ingestion of a large bird, while avoiding too sudden a variation in stiffness which could weaken the blade.

By volume rate of yarns or strands comprising given fibers in a texture portion is meant the ratio between the volume occupied by the yarns or strands comprising said fibers and the total volume occupied by all the yarns or strands in this portion. The yarns or strands can be made up solely of fibers of the same material. By "three-dimensional weaving" or "3D weaving", it is meant a mode of weaving by which at least some of the warp yarns bind weft yarns over several weft layers.

As specified above, the area of reduced stiffness is comprised between a first area and a second area extending respectively over a first length and a second length.

In one embodiment, the first length is comprised between 2% and 10% of the length of the preform measured in the transverse direction, and preferably comprised between 5% and 10% of the length of the preform measured in the transverse direction.

In one embodiment, the second length is comprised between 2 and 40% of the length of the blade measured in the transverse direction. For example, the second length is comprised between 5% and 35% of the length of the preform measured in the transverse direction.

The expressions "transverse direction" and "longitudinal direction" are used here with their usual meanings. The longitudinal direction corresponds to the direction connecting the portion of the preform intended to form the root of the blade to the portion of the preform intended to form its head, and the transverse direction connects the portion of the preform intended to form the leading edge and the portion of the preform intended to form the trailing edge of the blade.

Particularly, it may be noted that the weft yarns extend in the transverse direction while the warp yarns extend in the longitudinal direction. There is no departure from the framework of the invention when the weft or warp yarns are not strictly aligned with the aforementioned directions.

In such embodiments, the area of reduced stiffness Is remote from both the leading edge and the trailing edge of the blade.

The presence of the first and second areas allows ensuring that the areas intended to form the leading edge and the trailing edge of the blade have, in the longitudinal direction, uniform mechanical properties along the trailing edge or the leading edge. It could indeed be detrimental to the blade that its mechanical characteristics vary in the longitudinal direction of the leading edge or the trailing edge, that the first and second areas precisely allow to avoid.

In addition, having a first length comprised between 2% and 10% of the length of the preform measured in the transverse direction and a second length comprised between 2% and 40% of the length of the preform measured in the transverse direction allows ensuring that the first and second areas are wide enough not to be subject to excessive stress concentrations which could harm the mechanical strength of the blade in its conditions of use. Furthermore, the maximum values of the first and second lengths allow ensuring that the area of reduced stiffness is wide enough to effectively prevent the appearance of a chip in the event of ingestion of a large bird.

In one embodiment, it is preferred that the area of reduced stiffness is present only over a reduced thickness of the preform and on its skin. Indeed, the inventors have observed that the chip which forms during the ingestion of a large bird is generally located on a surface layer of the blade.

In one embodiment, the area of reduced stiffness can represent between 10% and 50% of the thickness of the preform, preferably between 10% and 30% of the thickness of the preform.

In one embodiment, the area of reduced stiffness is located on the surface of the preform and is present on the side of the preform intended to be the extrados side of the blade.

In one embodiment, the area of reduced stiffness represents between 10% and 50% of the thickness of the preform and is located on the surface of the preform is and is present on the side of the preform intended to be the extrados side of the blade.

Such an embodiment allows locating the area of reduced stiffness at the precise location where the stresses leading to the formation or propagation of a chip-type defect are present. Such a disposition also allows, without inconvenience on the mass, maintaining sufficient stiffness in the thickness of the blade by using the greater stiffness of the first fibers in the rest of the blade.

In one embodiment, outside the area of reduced stiffness, the volume rate of first fibers greater than or equal to 80%, is preferably greater than or equal to 95%.

In one embodiment, outside the area of reduced stiffness, the volume rate of second fibers is less than or equal to 20%, and preferably less than or equal to 5%.

In one embodiment, except at the level of the area of reduced stiffness, the fibrous texture only comprises yarns or strands made of first fibers.

In one embodiment, the area of reduced stiffness contains no fibers other than the first and second fibers.

In one embodiment, the material of the first fibers can be carbon.

In one embodiment, the material of the second fibers can be chosen among: glass, basalt, aramid, polyester, or a combination of these materials. Preferably, the material of the second fibers is glass.

In one embodiment, the material of the first fibers is carbon, and that of the second fibers is chosen among; glass, basalt, aramid, polyester, or a combination of these materials.

According to another of its aspects, the invention relates to a fan blade made of composite material comprising a fibrous reinforcement densified by a matrix, the fibrous reinforcement of the blade consisting of a fibrous texture as described above.

According to another of its aspects, the invention relates to an aeronautical turbomachine comprising a fan provided with a plurality of fan blades as described above.

A method for manufacturing a fan blade made of composite material as described above and comprising a fibrous reinforcement densified by a matrix can comprise the following steps: a fibrous texture such as the one presented above is made, said texture is shaped to obtain a blade preform, and a matrix is formed in the porosity of the preform to obtain the blade. The fibrous texture is obtained by three-dimensional weaving, and may for example have an interlock-type weave. The matrix can be an organic matrix and obtained from a resin. The matrix can thus be formed by resin injection molding (RTM or Resin Transfer Molding process).

BRIEF DESCRIPTION OF THE DRAWINGS

FIG. 1 is a schematic representation of a fibrous texture intended to form the fibrous reinforcement of a turbomachine blade.

FIG. 2 schematically represents a first embodiment of the invention.

FIG. 3 schematically represents another embodiment of the invention.

FIG. 4 schematically represents an aeronautical turbomachine according to one embodiment of the invention.

DESCRIPTION OF THE EMBODIMENTS

FIG. 1 shows a schematic view of a fibrous texture 10 intended to form the fibrous reinforcement of a turbomachine blade made of composite material comprising a fibrous reinforcement densified by a matrix. This fibrous texture can be obtained, for example, by three-dimensional weaving in a Jacquard-type loom of a fibrous blank and cutting of the excess yarns from the woven fibrous blank.

The fibrous texture 10 can have a three-dimensional weaving, and for example mainly comprise an interlock or multilayer weave. By "interlock weave" is meant a three-dimensional weave whose each layer of warp yarns binds several layers of weft yarns with all the yarns of the same warp column having the same movement in the weave plane. Document WO2006/136755 describes the production of such weaves. As will be described later, this fibrous texture can be shaped and then densified to obtain a fan blade.

The fibrous texture 10 extends in a longitudinal direction $D_L$ between a blade root portion 11, a blade airfoil portion 13 and the top of the blade 15. A blade stilt portion 12 is present between the blade root portion 11 and the blade airfoil portion 13. In general, the blade root portion 11 is thicker than the blade stilt portion 12, and the thickness of the blade airfoil portion 13 is variable. The fibrous texture 10 extends in a transverse direction DT between a first edge 16 intended to form the leading edge of the blade and a second edge 17 intended to form the trailing edge of the blade.

The blade stilt portion 12 ensures the transition in thickness between the blade root portion 11 and the blade airfoil portion 13. The blade stilt portion 12 extends, in the example illustrated, over a distance measured in the longitudinal direction that is less important at the level of the first edge 16 than at the level of the second edge 17.

In accordance with the invention, as shown in FIG. 1, the blade stilt portion 12 includes a first area 23 which extends in the transverse direction over a first length 21 between the first edge 16 and the area of reduced stiffness 24 and a second area 25 which extends in the transverse direction over a second length 22 between the second edge 17 and the area of reduced stiffness 24. In other words, the area of reduced stiffness 24 is located, in the transverse direction between the first area 23 and the second area 25.

In one embodiment, the first area 23 and the second area 25 comprise equal volume rates of first fibers.

In accordance with the invention, the area of reduced stiffness 24 comprises warp yarns or strands made of second fibers different from the first fibers, the second fibers having an elongation at break strictly greater than that of the first fibers.

In one embodiment, the area of reduced stiffness 24 has a first volume rate of yarns or strands made of second fibers strictly greater than the volume rate of yarns or is strands made of second fibers in the first area 23 and the second area 25, whether they are equal or not. In other words, there are more warp yarns or strands made of second fibers compared to the total number of yarns or strands in the area of reduced stiffness 24 than in the first 23 or the second 25 area.

In one embodiment, the first area 23 and the second area 25 comprise volume rates is of equal second fibers, and preferably less than 20%, or even less than 5.

In one embodiment, a first transition area, not shown, is provided, extending in the transverse direction between the first area 23 and the area of reduced stiffness 24 and comprising a volume rate of second fibers comprised between that of the first area 23 and that of the area of reduced stiffness 24.

Such a first transition area has mechanical properties between those of the first area 23 and that of the area of reduced stiffness 24 which allows avoiding a sudden variation in the mechanical properties that may create areas with a too strong evolution in stiffness which could harm the integrity of the blade.

Similarly, a second transition area, not shown, can be arranged, extending in the transverse direction between the area of reduced stiffness 24 and the second area 25 and comprising a volume rate of second fibers comprised between that of the area of reduced stiffness 24 and that of the second area 25, with the same advantage as above.

In one embodiment, a first transition area and a second transition area as defined above are arranged.

For example, the volume rate of second fibers of a transition area can be the arithmetic mean of the volume rates of second fibers of the two adjacent areas.

In one embodiment not illustrated here, it is possible that the area of reduced stiffness represents only part of the thickness of the preform, present on its skin. In such a case, and similarly to what has just been described for the transverse direction, a transition area can be arranged in the thickness of the preform. For example, in one embodiment, the thickness comprised between the surface of the preform intended to be the extrados side of the blade and a depth comprised between 10% and 30% of the thickness of the preform can comprise a volume rate of second fibers conforming to that of the area of reduced stiffness. Then a second thickness in contact with the first one and representing between 10% and 30% of the thickness of the preform, can comprise a volume rate of second fibers comprised between that of the area of reduced stiffness 24 and that of the first 23 or of the second area 25. The rest of the thickness of the preform, that is to say the entire thickness of the preform between the surface intended to be the intrados and the second thickness, can comprise a volume rate of fibers conforming to the first 23 or to the second 25 area.

The following table gives co on elongations at break of several fibers that can be used,

TABLE 1

| material of the fibers-reference | elongation at break (%) |
| --- | --- |
| glass-AGY "S-2 Glass ®" | 5.2 |
| glass-"E-Glass" | 4.4 |

TABLE 1-continued

| material of the fibers-reference | elongation at break (%) |
|---|---|
| polyester | 3.5 |
| basalt | 3 |
| aramid-Dupont "Kevlar ® 49" | 2.4 |
| carbon-Toray "HS T700" | 2.1 |
| carbon-Toray "HS TR30S" | 1.9 |
| carbon-Toray "HS T300 >>" | 1.5 |

For example, carbon can be chosen for the first fibers and glass can be chosen for the second fibers. It is also possible to use several types of warp yarns or strands which comprise different fibers having an elongation at break greater than that of the first fibers. It will be noted that the material of the first and second fibers can be identical. For example, the first and second fibers can be made of carbon, provided that their elongations at break are different. For example, it is possible to choose first carbon fibers made from HexTow®. IM7 (marketed by the company Hexcel), and second carbon fibers made from Torayca® T1100 (marketed by the company Toray).

The elongation at break of the first fibers may for example be less than or equal to 2.1%, and that of the second fibers greater than or equal to 2.4%.

As shown in FIG. 1, the geometry of the area of reduced stiffness 24 can be any geometry. Indeed, as defined above, the area of reduced stiffness 24 allows modifying the mechanical properties of the blade in the area where a chip could be formed. The geometry of the area of reduced stiffness 24 can therefore be chosen based on tests or simulations which allow identifying the area most likely to form a chip for a considered fibrous texture.

As specified above, the area of reduced stiffness 24 extends in a longitudinal direction from the stilt area and up to a height less than or equal to 30% of the blade height.

FIG. 1 schematically represents the point 101 having a blade height of 0% and corresponding to the bottom of the aerodynamic flowpath of the blade, and the point 102 having a blade height of 100% and corresponding to the highest point of the blade in the longitudinal direction $D_L$.

In the case of a stiffness area 24 of any geometry, such as the one shown in FIG. 1, the minimum height of the area of reduced stiffness can be counted for its lowest point 104, and likewise for the maximum height of the area of reduced stiffness counted from its highest point 103.

FIGS. 2 and 3 schematically represent two embodiments of the invention.

For the sake of representation, only some of the warp yarns 31 of second fibers have been represented schematically in FIGS. 2 and 3, to help in understanding the embodiments represented. The invention should not be considered as limited to these schematic embodiments.

In the embodiment represented in FIG. 2, the warp yarns or strands of second fibers 31 are introduced from the beginning of the weaving. In such a case, part of the root may contain warp yarns or strands made of second fibers 31. This results in a texture that is simpler to manufacture since indeed the warp yarns or strands made of second fibers are directly present at the time of the weaving of the root of the blade 11 and, consequently, are present from the weaving of the stilt area 12. The area of reduced stiffness 24 can thus extend throughout the stilt area of the blade 12 without the need to remove warp yarns or strands made of first fibers forming the root of the blade 11 to introduce new ones made of second fibers.

In another embodiment represented in FIG. 3, the warp yarns or strands made of second fibers can be inserted into the fibrous texture during its weaving. In this way, it is possible to have an area of reduced stiffness which is only present from the height of the insertion blade chosen for the warp yarns or strands made of second fibers 32. In other words, it is possible to choose precisely where the area of reduced stiffness 24 begins in this embodiment.

In one embodiment, all the warp yarns or strands of second fibers inserted during the weaving of the preform and comprised in the area of reduced stiffness 24 can correspond to warp yarns or strands introduced into the fibrous texture with the aim of increasing its thickness. Indeed, during the weaving of a texture, the number of warp yarns or strands can vary depending on the blade height, particularly to modify the thickness of the texture. Thus, warp yarns or strands must be introduced during the weaving of the texture to increase its thickness and it is particularly advantageous to introduce the warp yarns or strands of second fibers in that way, because it is then not necessary to remove warp yarns or strands of first fibers to replace them with warp yarns or strands of second fibers.

Similarly, warp yarns or strands can be removed from the fibrous texture in order to reduce its thickness. As described above, and as represented in FIGS. 2 and 3, the maximum height of the area of reduced stiffness 24 can be chosen so that the warp yarns or strands of second fibers it comprises correspond to warp yarns extracted from the preform to reduce the thickness of the fibrous texture.

In this embodiment, it is possible to dispense with any operation of replacement of the warp yarns or strands made of second fibers by warp yarns or strands made of first fibers at the end of the area of reduced stiffness 24.

In one embodiment not shown, it is possible that the warp yarns or strands made of second fibers are removed from the fibrous texture 10 at different heights in order to be able to control the thickness of the fibrous texture 10 in the transverse direction T.

To obtain a fan blade, a fibrous texture 10 is made by three-dimensional weaving, said texture is shaped to obtain a blade preform having the appropriate geometry, for example to obtain a blade with a trailing edge displaced upstream, and a matrix is formed in the porosity of the preform to obtain the blade. The fan blade can be made by a resin transfer molding (RTM) process where the preform is placed in a mold having the shape of the blade and in which a resin is injected and then polymerized. In this context, the matrix can be an organic matrix and obtained from an epoxy-type resin.

FIG. 4 shows an aeronautical turbomachine 200. Such a turbomachine 200 comprises a fan 210 disposed at the inlet of the engine fitted with a plurality of blades 211. The blades 211 are here made of composite material having a fibrous reinforcement densified by a matrix. Such blades 211 can be obtained from a fibrous texture 10 according to the invention by a method such as the one described above.

The invention claimed is:

1. A fibrous texture intended to form a fibrous reinforcement of a turbomachine blade made of composite material comprising the fibrous reinforcement densified by a matrix, the fibrous texture being in a single piece and having a three-dimensional weaving between a plurality of warp yarns or strands made of at least first fibers having a first elongation at break and extending in a longitudinal direction and a plurality of weft yarns or strands made of first fibers extending in a transverse direction, the fibrous texture comprising in the longitudinal direction a blade root portion, a blade airfoil portion and a blade stilt portion between the blade root portion and the blade airfoil portion, wherein the fibrous texture further comprises an area of reduced stiffness comprising warp yarns or strands made of second fibers having a second elongation at break greater than the first elongation at break, the area of reduced stiffness extending in the longitudinal direction from a stilt area and up to a height less than or equal to 30% of the height of the blade, the area of reduced stiffness extending in the transverse direction between a first area and a second area, the first area extending over a first length from a first edge of the fibrous texture intended to form a leading edge, and the second area extending over a second length from a second edge of the fibrous texture intended to form a trailing edge.

2. The fibrous texture according to claim 1, wherein the area of reduced stiffness has a volume rate of second fibers comprised between 25% and 75%.

3. The fibrous texture according to claim 1, wherein, outside the area of reduced stiffness, a volume rate of first fibers is greater than or equal to 80%.

4. The fibrous texture according to claim 1, wherein, outside the area of reduced stiffness, a volume rate of second fibers is less than or equal to 20%.

5. The fibrous texture according to claim 1, wherein the first length is comprised between 2% and 10% of a length of the fibrous preform measured in the transverse direction.

6. The fibrous texture according to claim 1, wherein the second length is comprised between 2% and 40% of the length of the fibrous preform measured in the transverse direction.

7. The fibrous texture according to claim 1, wherein the material of the first fibers is carbon.

8. The fibrous texture according to claim 1, wherein the area of reduced thickness represents between 10% and 50% of a thickness of the blade.

9. A fan blade made of the composite material comprising the fibrous reinforcement densified by the matrix, the fibrous reinforcement of the blade consisting of the fibrous texture according to claim 1.

10. An aeronautical turbomachine comprising a fan provided with a plurality of fan blades according to claim 9.

* * * * *